US009008211B2

(12) United States Patent
Fukawa et al.

(10) Patent No.: US 9,008,211 B2
(45) Date of Patent: Apr. 14, 2015

(54) RECEIVING DEVICE, RECEIVING METHOD, AND RECEIVING PROGRAM

(75) Inventors: Kazuhiko Fukawa, Tokyo (JP); Hiroshi Suzuki, Tokyo (JP); Satoshi Suyama, Tokyo (JP); Ryota Yamada, Osaka (JP); Takashi Yoshimoto, Osaka (JP); Naoki Okamoto, Osaka (JP)

(73) Assignees: Tokyo Institute of Technology, Tokyo (JP); Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/237,601

(22) PCT Filed: Aug. 6, 2012

(86) PCT No.: PCT/JP2012/070010
§ 371 (c)(1),
(2), (4) Date: Feb. 7, 2014

(87) PCT Pub. No.: WO2013/021973
PCT Pub. Date: Feb. 14, 2013

(65) Prior Publication Data
US 2014/0192936 A1 Jul. 10, 2014

(30) Foreign Application Priority Data

Aug. 10, 2011 (JP) .................................. 2011-174700

(51) Int. Cl.
*H04L 1/00* (2006.01)
*H04B 7/08* (2006.01)
*H04B 7/04* (2006.01)

(52) U.S. Cl.
CPC ............ *H04L 1/0054* (2013.01); *H04B 7/0854* (2013.01); *H04B 7/0413* (2013.01)

(58) Field of Classification Search
USPC .......................... 375/267, 340–341, 346–350
See application file for complete search history.

(56) References Cited

U.S. PATENT DOCUMENTS

2007/0253507 A1* 11/2007 Zhou et al. .................... 375/267
2008/0043864 A1 2/2008 Fujii

FOREIGN PATENT DOCUMENTS

JP 2008-048219 A 2/2008

OTHER PUBLICATIONS

English translation of Official Communication issued in corresponding International Application PCT/JP2012/070010, mailed on Feb. 20, 2014.
Official Communication issued in International Patent Application No. PCT/JP2012/070010, mailed on Nov. 6, 2012.
Zheng et al., "Near-Optimal Signal Detection in Noise Enhancement Subspace for Spatially Correlated MIMO Channels," IEICE Transactions on Communications, The Institute of Electronics, Information and Communication Engineers, Aug. 1, 2011, pp. 432.
Fukawa et al., "Suboptimal Signal Detection for MIMO Communications," IEICE Technical Report, The Institute of Electronics, Information and Communication Engineers, Jun. 16, 2011, pp. 105-110.
Zheng et al., "Near-Optimal Signal Detection Based on the MMSE Detection Using Multi-Dimensional Search for Correlated MIMO Channels," The Institute of Electronics, Information and Communication Engineers, vol. E94-B, No. 8, Aug. 2011, pp. 2346-2356.
Yao et al., Lattice-Reduction-Aided Detectors for MIMO Communication Systems, IEEE, Nov. 17, 2002, pp. 424-428.
Wübben et al., "Near-Maximum-Likelihood Detection of MIMO Systems using MMSE-Based Lattice-Reduction," IEEE Communications Society, 2004, pp. 798-802.

* cited by examiner

*Primary Examiner* — Curtis Odom
(74) *Attorney, Agent, or Firm* — Keating & Bennett, LLP

(57) ABSTRACT

A receiving device, a receiving method, and a receiving program are provided and are capable of reducing performance degradation in a case where the spatial correlation of a channel becomes high. A transmission signal candidate search unit searches for a transmission signal in a direction in which reception performance is degraded, in MIMO signal detection. A transmission signal candidate generation unit generates transmission signal candidates while suppressing degradation due to the spatial correlation of a channel. In a decision unit, using the transmission signal candidates generated in the transmission signal candidate generation unit, a maximum likelihood sequence is obtained. The maximum likelihood sequence is obtained as transmission signal candidates where a metric is calculated and the metric becomes a minimum.

14 Claims, 15 Drawing Sheets

RECEIVING DEVICE, RECEIVING METHOD, AND RECEIVING PROGRAM

TECHNICAL FIELD

The present invention relates to a receiving device, a receiving method, and a receiving program that perform communication using MIMO transmission.

BACKGROUND ART

In the field of wireless communication in recent years, in many systems, MIMO (Multiple Input Multiple Output) transmission has been adopted that utilizes a plurality of transmit and receive antennas and is capable of performing high-speed transmission without widening a frequency bandwidth. In general, in the MIMO transmission, since a plurality of data streams are transmitted using the same frequency, MIMO signal detection becomes necessary in a receiving device.

In a MIMO signal detection technique, as an optimum detection technique, maximum likelihood detection (MLD) has been used. This is a technique for detecting transmission signal candidates maximizing a likelihood function, from among all transmission signal candidates. Since the number of transmission signal candidates exponentially increase with the number of constellations or the number of transmission streams of a modulation method, in the MLD there has been a problem that a calculation amount becomes quite large.

In NPL 1, a technique has been described in which the calculation amount of the MLD is reduced by efficiently reducing the number of transmission signal candidates. In NPL 1, by searching for a transmission signal candidate in the direction of noise enhancement serving as a factor causing an error to occur in MMSE (Minimum Mean Square Error) detection serving as linear detection in which a calculation amount is very small while a transmission characteristic is not good, a calculation amount is significantly reduced from that of the MLD while performance is prevented from being lowered.

CITATION LIST

Non Patent Literature

NPL 1: Liming Zheng, Kazuhiko Fukawa, Hiroshi Suzuki, Satoshi Suyama, "Near-Optimal Siganl Detection in Noise Enhancement Subspace for Spatially Correlated MIMO Channels", The General Conference of The Institute of Electronics, Information and Communication Engineers B-5-46, March 2011

SUMMARY OF INVENTION

Technical Problem

However, in the technique described in NPL 1, there has been a problem that reception performance is significantly degraded in a case where the spatial correlation of a MIMO channel becomes high.

In view of such a situation, the present invention is made, and it is an object thereof to provide a receiving device, a receiving method, and a receiving program, which are capable of reducing performance degradation in a case where the spatial correlation of a MIMO channel becomes high.

Solution to Problem

The present invention provides a receiving device that performs communication using MIMO transmission, the receiving device including a transmission signal candidate search unit configured to search for transmission signal candidates with taking into consideration noise enhancement, a transmission signal candidate generation unit configured to generate transmission signal candidates from the searched signals while suppressing an influence of a spatial correlation of a channel, and a decision unit configured to obtain a maximum likelihood sequence using the generated transmission signal candidates.

The transmission signal candidate generation unit includes a first shifting and scaling unit configured to perform shifting and scaling on the basis of a modulation method, a basis transformation unit configured to perform basis transformation by multiplying a basis transformation matrix, a quantization unit configured to round to an integer value, an inverse basis transformation unit configured to perform an inverse operation of an operation performed by the basis transformation unit, and a second shifting and scaling unit configured to perform an inverse operation of an operation performed by the first shifting and scaling unit and generate the transmission signal candidates.

In addition, the transmission signal candidate generation unit includes a basis transformation unit configured to perform basis transformation by multiplying a basis transformation matrix, a first shifting and scaling unit configured to perform shifting and scaling on the basis of a modulation method, a quantization unit configured to round to an integer value, a second shifting and scaling unit configured to perform an inverse operation of an operation performed by the first shifting and scaling unit, and an inverse basis transformation unit configured to perform an inverse operation of an operation performed by the basis transformation unit and generate the transmission signal candidates.

These transmission signal candidate generation units generate the transmission signal candidates using a channel matrix and a reception signal that are expanded.

In addition, the transmission signal candidate search unit searches for transmission signal candidates with taking into consideration an arbitrary position expressed by noise enhancement and expressed by an IQ plane.

In addition, the transmission signal candidate search unit searches for transmission signal candidates with taking into consideration noise enhancement and a modulation method.

In addition, the transmission signal candidate search unit searches for transmission signal candidates corresponding to a part of signals obtained by a linear detection and performs hard decision on remaining signals obtained by the linear detection and outputs resultant signals.

Here, the transmission signal candidate generation unit generates transmission signal candidates using a channel corresponding to the part of signals.

In addition, a candidate selection unit is further included that performs selection relating to whether or not to suppress the influence of a spatial correlation over the searched signals on the basis of the spatial correlation of a channel.

The candidate selection unit generates transmission signal candidates by quantizing signals that are not suppressed by the influence of a spatial correlation, and the decision unit obtains a maximum likelihood sequence using transmission signal candidates generated by the transmission signal candidate generation unit and transmission signal candidates generated by the candidate selection unit.

In addition, the receiving device further includes a decoding unit configured to perform error correction decoding, wherein the decision unit obtains a bit log-likelihood ratio of the maximum likelihood sequence, and the decoding unit performs error correction decoding on the bit log-likelihood ratio of the maximum likelihood sequence.

Furthermore, the decision unit obtains the bit log-likelihood ratio of the maximum likelihood sequence based on the transmission signal candidates and a bit log-likelihood ratio after the decoding.

In addition, the present invention provides a receiving method for a receiving device performing communication using MIMO transmission, the receiving method including a transmission signal candidate search process searching for transmission signal candidates with taking into consideration noise enhancement, a transmission signal candidate generation process generating transmission signal candidates from the searched signals while suppressing an influence of a spatial correlation of a channel, and a decision process of obtaining a maximum likelihood sequence using the generated transmission signal candidates.

In addition, the present invention provides a receiving program for causing a computer to execute the individual processes in the receiving method.

Advantageous Effects of Invention

In this way, in the present invention, since a transmission signal candidate is generated by performing, in a stage subsequent to signal search, processing for suppressing degradation due to the spatial correlation of a MIMO channel, it may be possible to suppress the performance degradation even if the spatial correlation of a channel becomes high.

DESCRIPTION OF EMBODIMENTS

Hereinafter, using drawings, the details of the present invention will be described.

In the following embodiments, it is assumed that the number of transmit antennas is NT and the number of receive antennas is NR. In addition, while description will be performed on the assumption that a transmission data stream is transmitted from each transmit antenna, in other words, the number of data streams and the number of transmit antennas are equal to each other, the present invention is not limited to this, and the present invention also includes a case in which a plurality of data stream are transmitted whose number is smaller than the number of transmit antennas.

First Embodiment

Figure 1:
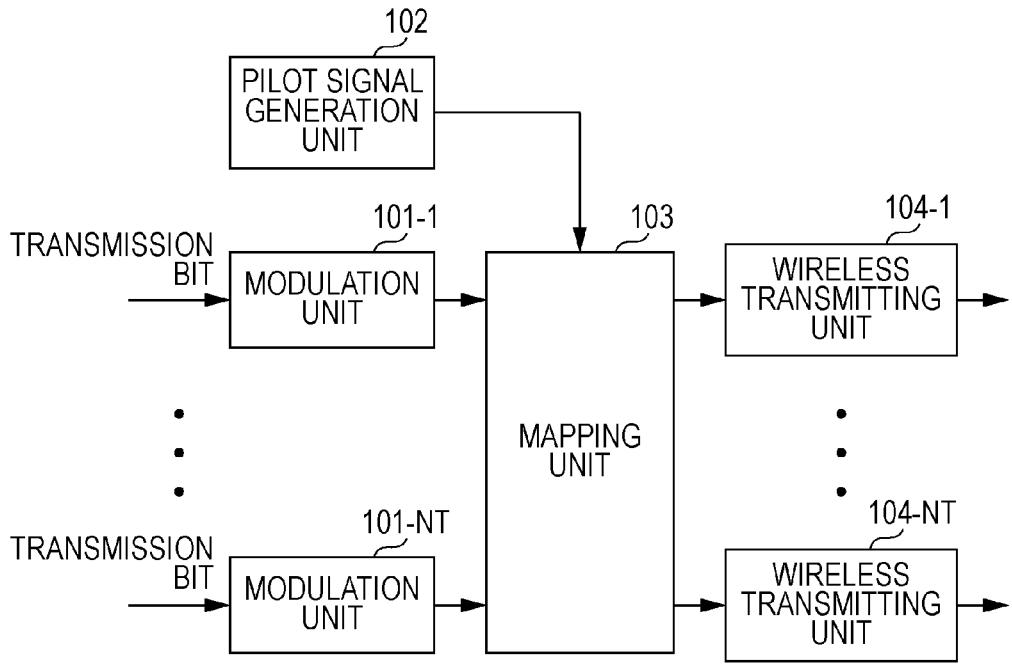
FIG. 1 is a block diagram illustrating a configuration of a transmitting device of a first embodiment.

FIG. 1 is a block diagram illustrating the configuration of a transmitting device of the present embodiment.

The transmitting device includes modulation units 101-1 to 101-NT, a pilot signal generation unit 102, a mapping unit 103, and wireless transmitting units 104-1 to 104-NT.

The modulation units 101-1 to 101-NT map transmission bits to modulation symbols such as PSK (Phase Shift Keying) or QAM (Quadrature Amplitude Modulation). The pilot signal generation unit 102 generates a pilot signal serving as a signal already known in transmitting and receiving devices. The mapping unit 103 allocates a modulation symbol and a pilot signal to a resource. While here the resource is a domain defined by a frequency and a time, the resource in the present embodiment indicates a time so as to illustrate an application example in a narrow band transmission, in the present embodiment. The outputs of the mapping unit 103 are subjected to digital-to-analog conversion, waveform shaping, frequency conversion, and so forth in the wireless transmitting units 104-1 to 104-NT, and transmitted from transmit antennas (not illustrated) whose number is NT.

Figure 2:
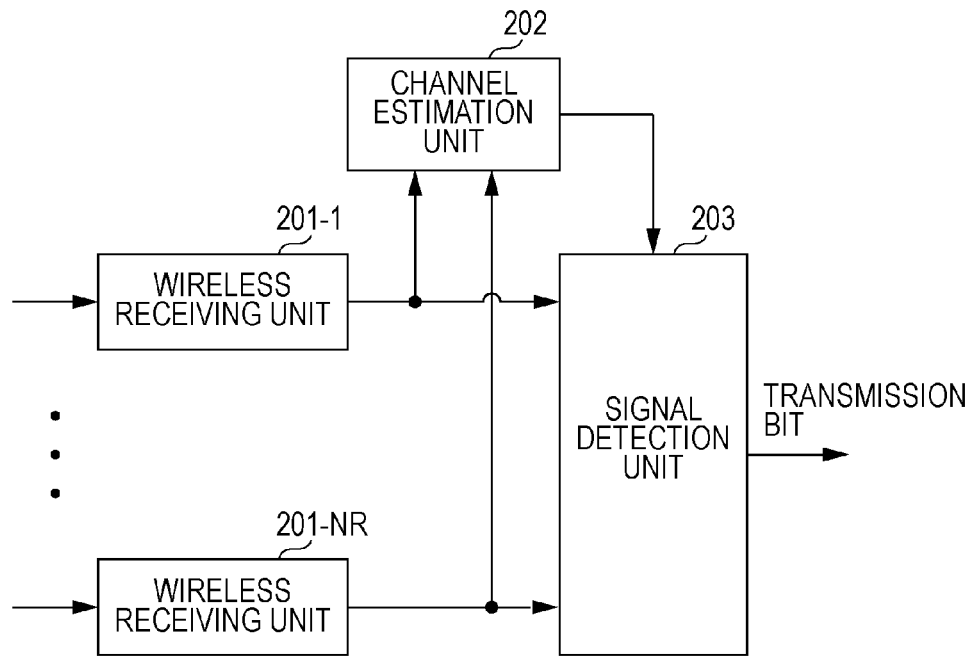
FIG. 2 is a block diagram illustrating a configuration of a receiving device in the first embodiment.

FIG. 2 is a block diagram illustrating the configuration of a receiving device in the present embodiment.

The receiving device includes wireless receiving units 201-1 to 201-NR, a channel estimation unit 202, and a signal detection unit 203.

Reception waves received by receive antennas (not illustrated) whose number is NR are subjected to frequency conversion, filtering, and analog-to-digital conversion in the wireless receiving units 201-1 to 201-NR, and output as reception signals. Using a pilot signal, the channel estimation unit 202 performs channel estimation to obtain a channel estimation value. Using the reception signal and the channel estimation value, the signal detection unit 203 detects a transmission bit.

Figure 3:
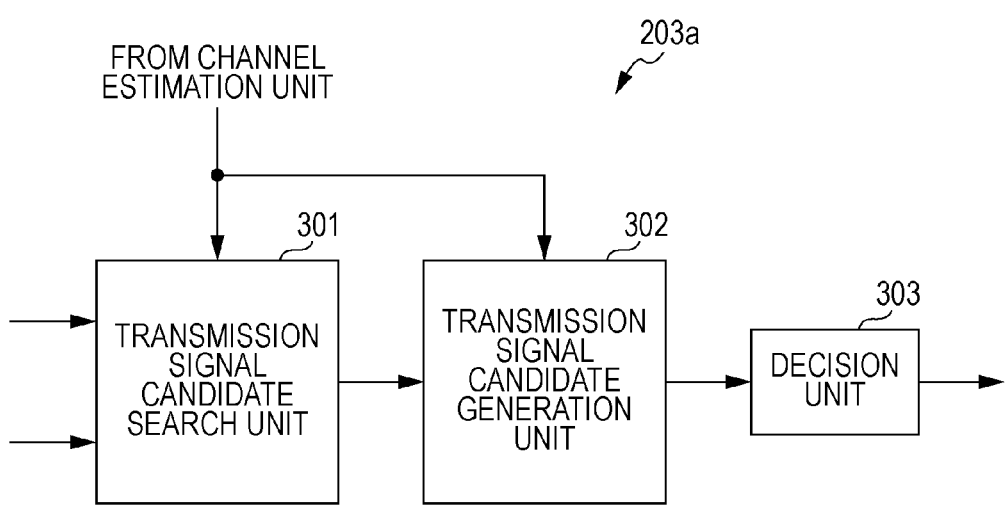
FIG. 3 is a schematic block diagram of a signal detection unit in the first embodiment.

FIG. 3 is a schematic block diagram of a signal detection unit 203a.

The signal detection unit 203a includes a transmission signal candidate search unit 301, a transmission signal candidate generation unit 302, and a decision unit 303. The transmission signal candidate search unit 301 searches for a transmission signal in a direction in which reception performance is degraded in MIMO signal detection. For example, in the case of ZF (Zero Forcing) detection or MMSE (Minimum Mean Square Error) detection, which serves as a linear detection technique, a transmission signal candidate is searched for in the direction of noise enhancement. While, in a related art, the output of the transmission signal candidate search unit 301 is quantized to obtain a transmission signal candidate, a transmission signal candidate is generated, in the transmission signal candidate generation unit 302, with suppressing degradation due to the spatial correlation of a channel, in the present invention. In the decision unit 303, using the transmission signal candidate generated in the transmission signal candidate generation unit 302, a maximum likelihood sequence is obtained. As for the maximum likelihood sequence, a metric is calculated, and a transmission signal candidate is obtained where the metric becomes a minimum. For example, if the reception signal is expressed as Expression (1), the metric is expressed as Expression (2).

[Math. 1]

$$y = Hs + n \quad (1)$$

$$\|y - \hat{H}s_b\|^2 \quad (2)$$

In this regard, however, the y is an NR-dimensional reception signal vector, the H is a NR-row and NT-column channel matrix, the s is an NT-dimensional transmission signal vector, the n is an NR-dimensional noise vector, the $\hat{H}$ is a NR-row and NT-column channel estimation value, the $s_b$ is an NT-dimensional transmission signal candidate vector defined by a bit sequence $b=[b_{1,1}, \ldots, b_{k,n}, \ldots, b_{N_T,N}]$. In addition, as for the N, if it is assumed that the number of constellations in a modulation method is M, $N=\log_2 M$ is satisfied.

The detail of the transmission signal candidate search unit 301 in a case of use of MMSE detection will be described using mathematical expressions. In the MMSE detection, the following NR-row and NT-column weighting matrix is used.

[Math. 2]

$$W^H = P\hat{H}^H \quad (3)$$

$$P = (\hat{H}^H \hat{H} + \sigma_n^2 I_{NT})^{-1} \quad (4)$$

In this regard, however, the superscript H expresses a complex conjugate transpose matrix, the $\sigma_n^2$ expresses an average noise power, and the $I_{NT}$ expresses an NT-row and NT-column identity matrix. Here, the matrix P is an NT-row and NT-column Hermitian matrix where $\sigma_n^2 P$ becomes the covariance matrix of an error. In order to search for a transmission signal with consideration for noise enhancement, the eigenvalue decomposition of the P is expressed using the following Expression.

[Math. 3]

$$P = VDV^H \quad (6)$$

$$D = \text{diag}[\lambda_1 \lambda_2 \ldots \lambda_{NT}] \quad (7)$$

In this regard, however, the V is an NT-row and NT-column unitary matrix, and the D is a diagonal matrix having eigenvalues $\lambda d$ to $\lambda NT$ as diagonal elements. In addition, as for the magnitudes of the eigenvalue, it is assumed that $\lambda 1 \geq \lambda 2 \geq \ldots \geq \lambda NT$ is satisfied. In addition, since the P is a positive definite matrix, all the eigenvalues are positive, in other words, $\lambda NT > 0$ is satisfied. It may be estimated that an eigenvalue whose value is large causes performance degradation. At this time, a signal $\hat{s}_{init}$ after search may be obtained according to the following Expression.

[Math. 4]

$$\hat{s}_{init} = \hat{x} + \sum_{k_1=1}^{N_p} (\hat{a}(m,k))_{k_1} \lambda_{k_1}^{1/2} v_{k_1} \quad (8)$$

$$\hat{a}(m,k) = e(m,k)(\tilde{c}_k^H \tilde{c}_k)^{-1} \tilde{c}_k \quad (9)$$

-continued $$e(m,k) = b(m) - (\hat{x})_k \quad (10)$$

$$\tilde{c}_k^H = [\lambda_1^{1/2}(v_1)_k, \lambda_2^{1/2}(v_2)_k, \ldots, \lambda_{N_p}^{1/2}(v_{N_p})_k] \quad (11)$$

In this regard, however, the $\hat{x}$ is a signal after MMSE detection. In addition, the Np satisfies $1 \leq Np \leq NT$, and denotes the number of eigenvalues to be considered in signal candidate search, the $v_k$ is the k-th column vector of a matrix V, and $(A)_k$ denotes the k-th element of a vector A. In addition, the b(m) denotes one of modulation symbols. Therefore, since $1 \leq m \leq M$ is satisfied, M different b(m)s exist. Since M×NT different $\hat{s}_{init}$s exist, it may be possible to obtain M×NT+1 different signals if the $\hat{x}$ is also added. In addition, instead of obtaining the $\hat{a}(m,k)$ by taking into consideration the constellation of a modulation method as shown in Expression (8), each element of the $\hat{a}(m,k)$ may also be set to a random variable. According to this, it may be possible to consider an arbitrary position expressed not by the constellation of a modulation method but by an IQ plane. In addition, the IQ plane is a plane having I axis (in phase axis) as a horizontal axis and a Q axis (quadrature phase axis) as a vertical axis. The random variable may be set as a random variable distributed in accordance with, for example, a complex Gaussian distribution whose average is zero and whose variance is $\sigma_n^2$. In a case of use of a random variable, it may also be possible to set the number of $\hat{s}_{init}$s to M×NT+1 or more, and it may also be possible to set the number of $\hat{s}_{init}$s to M×NT+1 or less. If the number of $\hat{s}_{init}$s is decreased, it may be possible to reduce a computation amount, and if the number of $\hat{s}_{init}$s is increased, it may be possible to improve reception performance such as a bit error rate. If a searched signal is quantized, a transmission signal candidate is obtained. However, a probability that a correct transmission signal is included in a transmission signal candidate turns out to be reduced in a case where the spatial correlation of a channel is high. Therefore, in the transmission signal candidate generation unit 302, a transmission signal candidate is generated with suppressing the influence of the spatial correlation of a channel.

The detail of the transmission signal candidate generation unit 302 will be described using a mathematical expression.

In the transmission signal candidate generation unit 302, degradation due to a spatial correlation is suppressed on the basis of LR (lattice reduction: Lattice Reduction). In the LR, by transforming the basis of a channel matrix H into a state of being nearly orthogonal, the channel matrix H is transformed into a form in which MIMO demultiplexing may be easily performed. If an NT-row and NT-column basis transformation matrix is T, H'=$\hat{H}$T turns out to be used. In addition, the matrix T is a complex number in which both of the real part and the imaginary part of each element become integer numbers, and a unimodular matrix in which |det(T)|=1 is satisfied. For example, using an LLL (Lenstra, Lenstra, Lovasz) algorithm or the like serving as a related art, it may be possible to obtain the matrix T. In addition, the det(•) denotes a determinant. It is assumed that a weighting matrix in which $\hat{H}$ is substituted with the H' in Expression (3) is W'. The MMSE detection due to the LR is performed according to the following Expression using the weighting matrix W'.

[Math. 5]

$$\tilde{s}' = (W')^H y \quad (12)$$
$$\simeq T^{-1} W^H y$$

As understood from Expression (12), a result obtained by performing MMSE detection using the W' is approximately equivalent to a result obtained by multiplying a result obtained by performing MMSE detection using the W, by the inverse matrix $T^{-1}$ of a transformation matrix from the left. If this fact is used, the transmission signal candidate search unit 301 performs a linear operation with a MMSE detection result as a starting point, and hence, it may be possible for the transmission signal candidate generation unit 302 to reduce the influence of the spatial correlation of a channel using the matrix T and obtain a transmission signal candidate. In addition, the same applies to the case of the ZF detection.

Figure 4:
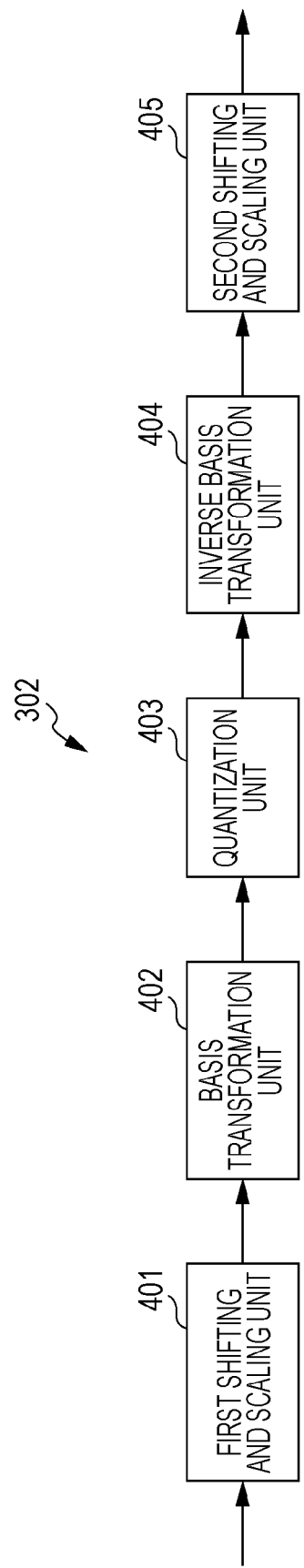
FIG. 4 is a schematic block diagram of a transmission signal candidate generation unit 302 in the first embodiment.

FIG. 4 is a schematic block diagram of the transmission signal candidate generation unit 302.

The transmission signal candidate generation unit 302 includes a first shifting and scaling unit 401, a basis transformation unit 402, a quantization unit 403, an inverse basis transformation unit 404, and a second shifting and scaling unit 405.

The first shifting and scaling unit 401 performs shifting and scaling for a signal so that quantization in the quantization unit 403 in a subsequent stage finishes with simple rounding. The detail will be described later. The basis transformation unit 402 performs the basis transformation of the channel matrix H using such a matrix T as described above. In the quantization unit 403, the output of the basis transformation unit 402 is quantized. The quantization may be performed by rounding to an integer value. The inverse basis transformation unit 404 performs the inverse transformation of the basis transformation performed in the basis transformation unit 402. The second shifting and scaling unit 405 performs the inverse operation of the operation performed by the first shifting and scaling unit 401. The output of the second shifting and scaling unit 405 becomes a transmission signal candidate.

The detail of the transmission signal candidate generation unit 302 will be described using mathematical expressions.

Figure 5:
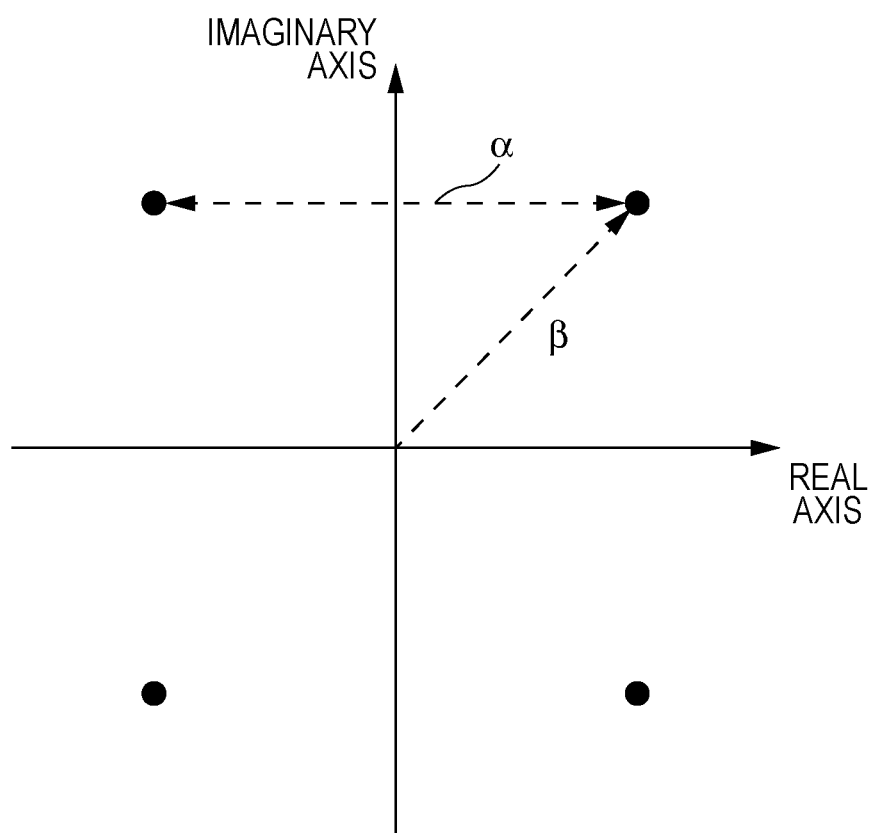
FIG. 5 is a diagram for explaining a shifting and scaling operation in the first embodiment.

FIG. 5 is a diagram for explaining a shifting and scaling operation. Black circles in the drawing individually denote modulation symbols. In addition, it is assumed that α is a distance between adjacent modulation symbols and β denotes a shift from a reference point. In the case of use of QAM for a modulation method, the following relationship exists between α and β.

[Math. 6]

$$\beta = \frac{\alpha}{2} + j\frac{\alpha}{2} \quad (13)$$

In this regard, however, j is an imaginary unit, and $j^2 = -1$ is satisfied. FIG. 5 is the case of QPSK (4QAM).

Accordingly, a modulation symbol vector s may be expressed in the following way.

[Math. 7]

$$s = \alpha(\bar{s} + \tfrac{1}{2}c) \quad (14)$$

In addition, the vector c is an NT-dimensional vector in which each element is 1+j, the vector $s^-$ is an NT-dimensional vector having a reference point as an element, and in that element, each of a real part and an imaginary part has one of the values of Expression (15).

[Math. 8]

$$\left[-\frac{\sqrt{M}}{2}, \ldots, \frac{\sqrt{M}}{2} - 1\right] \quad (15)$$

For example, in the case of QPSK (4QAM), since M=4 is satisfied, Expression (15) turns out to be [−1,0]. Accordingly, the element of the $s^-$ becomes the following.

$$(-\tfrac{1}{2}\pm\tfrac{1}{2}) + j(-\tfrac{1}{2}\pm\tfrac{1}{2}) \quad \text{[Math. 9]}$$

It is assumed that the (m,k)-th of the outputs of the transmission signal candidate search unit 301 is $\hat{s}'_{init}(m,k)$. The first shifting and scaling unit 401 performs shifting and scaling according to the following Expression by substitution of Expression (14) so that quantization in a subsequent stage becomes easy.

[Math. 10]

$$\hat{s}'_{init}(m,k) = 1/\alpha \hat{s}_{init}(m,k) - \tfrac{1}{2}c \quad (16)$$

By multiplying the signal $\hat{s}'_{init}(m,k)$ after the shifting and scaling, by a transformation matrix as shown in the following Expression, the basis transformation unit 402 transforms the basis of a MIMO channel.

[Math. 11]

$$s'_T(m,k) = T^{-1}\hat{s}'_{init}(m,k) \quad (17)$$

The quantization unit 403 performs quantization by rounding both of the real part and the imaginary part of a signal that is subjected to the basis transformation.

[Math. 12]

$$\hat{s}'_T(m,k) = Q(s'_T(m,k)) \quad (18)$$

In addition, the Q( ) denotes quantization. The inverse basis transformation unit 404 performs, on a signal after the quantization, the inverse operation of an operation conducted by the basis transformation unit 402 in such a way as Expression (19).

[Math. 13]

$$\hat{s}'(m,k) = T\hat{s}'_T(m,k) \quad (19)$$

The second shifting and scaling unit 405 performs the inverse operation of the operation performed by the first shifting and scaling unit 401 in such a way as Expression (20).

[Math. 14]

$$\hat{s}(m,k) = \alpha(\hat{s}'(m,k) + (\tfrac{1}{2})c) \quad (20)$$

The obtained $\hat{s}(m,k)$ becomes one transmission signal candidate. If $\hat{s}(m,k)$ is obtained with respect to all the m and k in addition to the signal $\hat{x}$ after the MMSE detection, all the searched transmission signal candidates may be obtained. As for the obtained transmission signal candidates, a transmission signal candidate where Expression (2) becomes a minimum is obtained in the decision unit.

Figure 6:
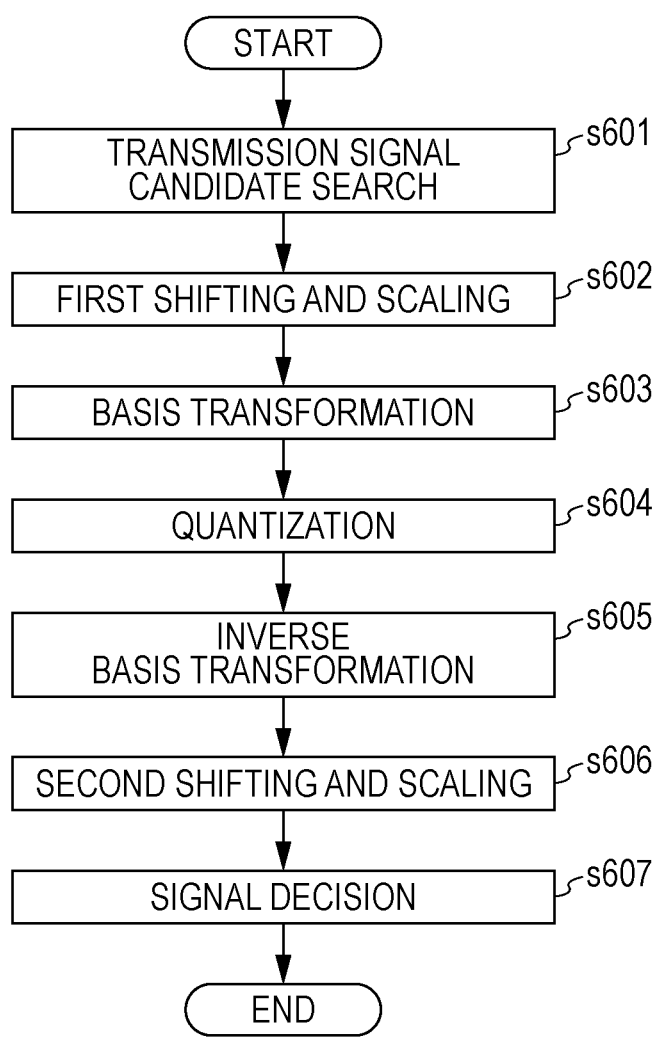
FIG. 6 is a flowchart of reception processing in the first embodiment.

FIG. 6 is a flowchart of reception processing in the present embodiment.

In step s601, the transmission signal candidate search unit 301 searches for a transmission signal candidate with the detection result of MMSE as a starting point and taking into consideration noise enhancement, and sends the transmission signal candidate to the transmission signal candidate generation unit 302. In step s602, the first shifting and scaling unit 401 in the transmission signal candidate generation unit 302 performs shifting and scaling on the basis of a modulation method so that quantization is able to be performed. In step s603, the basis transformation unit 402 performs the basis transformation of a channel matrix using a basis transformation matrix. In step s604, the quantization unit 403 performs quantization approximating by integer values. In step s605, the inverse basis transformation unit 404 performs the inverse operation of the basis transformation performed in the step s603. In step s606, the second shifting and scaling unit 405 performs the inverse operation of the processing operation in the step s602 and obtains a transmission signal candidate. In step s607, the decision unit 303 calculates a metric using the transmission signal candidate, and obtains and outputs a maximum likelihood sequence.

In this way, in the first embodiment, after the search for a transmission signal candidate, the influence of the spatial correlation of a channel is suppressed, and then, quantization is performed to obtain a transmission signal candidate. Specifically, on the basis of the lattice reduction, the influence of the spatial correlation is reduced. According to this, since a probability that a transmission signal transmitted by a transmitting device remains as a transmission signal candidate is increased, reception performance is improved.

In addition, the present invention is not limited to the transmission signal search technology described in the above-mentioned first embodiment, and may also be applied to a method in which a linear operation and quantization are performed.

(Example of Modification to First Embodiment)

Figure 15:
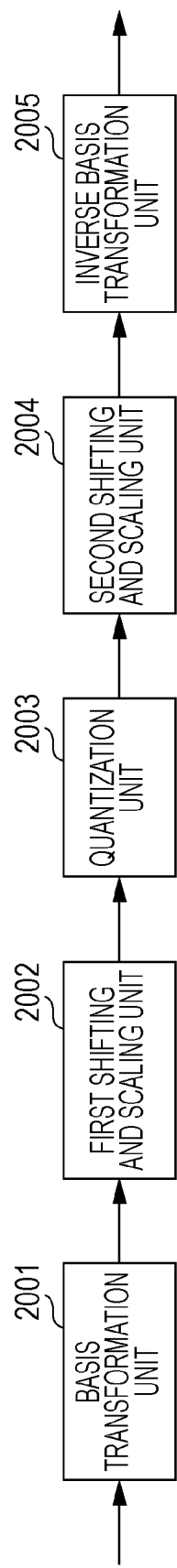
FIG. 15 is a schematic block diagram of a transmission signal candidate generation unit in which order of blocks is changed in an example of a modification to the first embodiment.

The transmission signal candidate generation unit 302 described in the above-mentioned first embodiment using FIG. 4 may also generate an equivalent signal even if the order of blocks is changed. FIG. 15 is a schematic block diagram of the transmission signal candidate generation unit 302 in which the order of blocks is changed. The transmission signal candidate generation unit 302 includes a basis transformation unit 2001, a first shifting and scaling unit 2002, a quantization unit 2003, a second shifting and scaling unit 2004, and an inverse basis transformation unit 2005. In the basis transformation unit 2001, using the basis transformation matrix T, the basis transformation of a channel is performed on the output of the transmission signal candidate search unit 301. The first shifting and scaling unit 2002 performs shifting and scaling so that quantization in the quantization unit 2003 in a subsequent stage finishes with simple rounding. The quantization unit 2003 performs quantization in such a manner that each of the real part and the imaginary part of the output of the first shifting and scaling unit 2002 is rounded to an integer value. The second shifting and scaling unit 2004 performs the inverse operation of the operation performed by the shifting and scaling in the first shifting and scaling unit 2002. The inverse basis transformation unit 2005 performs the inverse transformation of the basis transformation performed in the basis transformation unit 2001. Detailed description will be performed using mathematical expressions.

The basis transformation unit 2001 performs the basis transformation according to the following Expression.

[Math. 15]

$$\hat{s}_{init,T}(m,k)=T^{-1}\hat{s}_{init}(m,k) \tag{A1}$$

The first shifting and scaling unit 2002 performs the shifting and scaling according to the following Expression.

[Math. 16]

$$s'_T(m,k) = \frac{1}{\alpha}\hat{s}_{init,T}(m,k) - \frac{1}{2}T^{-1}c \tag{A2}$$

Here, the $s_T'(m,k)$ obtained in Expression (A2) and the $s_T'(m,k)$ obtained in Expression (17) become equivalent to each other.

The quantization unit 2003 performs quantization by rounding each of the real part and the imaginary part of the $s_T'(m,k)$ to an integer value.

[Math. 17]

$$\hat{s}'_T(m,k)=Q(s'_T(m,k)) \tag{A3}$$

In the second shifting and scaling unit 2004, the inverse operation of the operation performed by the first shifting and scaling unit 2002 is performed according to the following Expression.

[Math. 18]

$$\hat{s}_T(m,k)=\alpha(\hat{s}'_T(m,k)+(\tfrac{1}{2})T^{-1}c) \tag{A4}$$

In the inverse basis transformation unit 2005, the inverse transformation of the basis transformation performed in the basis transformation unit 2001 is performed according to the following Expression, and a transmission signal candidate is generated.

[Math. 19]

$$\hat{s}(m,k)=T\hat{s}_T(m,k) \tag{A5}$$

Here, the transmission signal candidate obtained in Expression (A5) and the transmission signal candidate obtained in Expression (20) become equivalent to each other.

In addition, shuffling between the basis transformation unit 2001 and the first shifting and scaling unit 2002 and shuffling between the second shifting and scaling unit 2004 and the inverse basis transformation unit 2005 may be performed independently.

Second Embodiment

Figure 16:
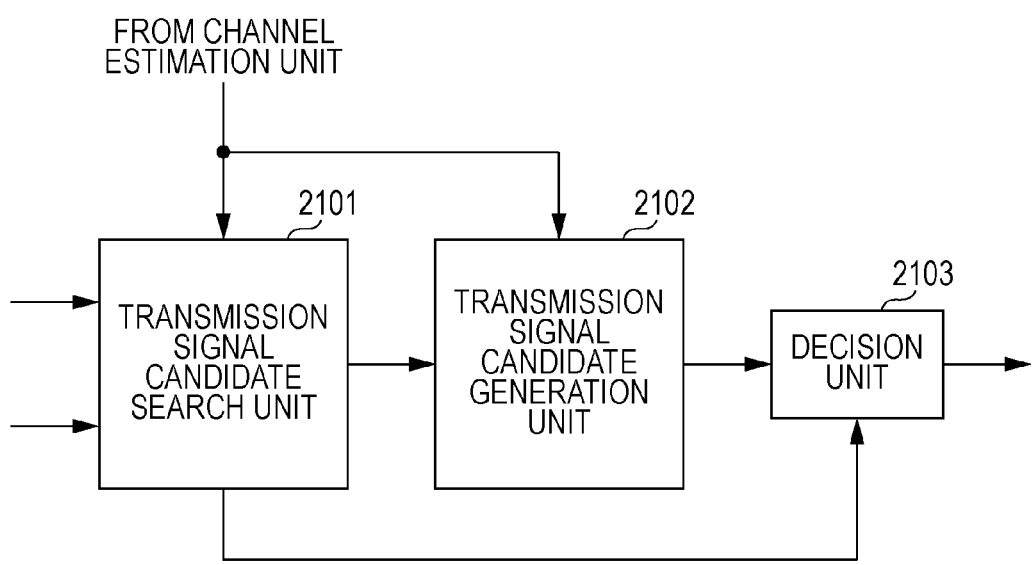
FIG. 16 is a block diagram illustrating a configuration of a signal detection unit in a second embodiment.

Since there is a difference in the signal detection unit 203 in FIG. 2 between the present embodiment and the first embodiment, the other description will be omitted. FIG. 16 is a block diagram illustrating the configuration of the signal detection unit 203 in the present embodiment. The signal detection unit 203 includes a transmission signal candidate search unit 2101, a transmission signal candidate generation unit 2102, and a decision unit 2103. The transmission signal candidate search unit 2101 is different from the transmission signal candidate search unit 301 described in FIG. 3 in the first embodiment, and searches for a transmission signal with respect only to some elements of the elements of the signal x̂ after the MMSE detection. If the error of the signal x̂ after the MMSE detection is small, one element of the x̂ may also be subjected to hard decision. Since the error of the MMSE detection is proportional to the diagonal element of the P in Expression (4), the diagonal element of the P may be used, for example. At the moment, it is assumed that the (i,i)-th ($1 \le i \le NT$) element P(i,i) of the P is small. It is assumed that a result obtained by performing hard decision on the i-th element of the signal x̂ after the MMSE detection is $s_e(i)$ and the i-th column vector of the H^ is h^$_i$. If Expression (1) is deformed and the component of the s$_e$(i) is subtracted,

[Math. 20]

$$y' = y - \hat{h}_i s_e(i) \quad (A6)$$

is satisfied, and this y' may be used in place of the y.

In addition, if, in place of the H^, an NR-row and NT-1-column channel matrix H^$_i$ is used that is obtained by extracting the h^$_i$ from the H^, the number of transmit antennas practically becomes NT-1, which becomes equivalent to the detection of transmission signals other than the i-th element. In this way, the transmission signal candidate search unit 2101 may search for a transmission signal other than the i-th element, and it may be possible to reduce a computation amount taken for search. In addition, as the decision value s$_e$(i), the i-th element is output to the decision unit 2103. The transmission signal candidate generation unit 2102 performs the operation of shifting and scaling and the operation of quantization on a transmission signal other than the i-th element. Specifically, the basis transformation matrix is obtained not from the H^ but from the H^$_i$, and an NT-1-row and NT-1-column basis transformation matrix is used. Using the y', the H^$_i$, and a transmission signal candidate obtained in the transmission signal candidate generation unit 2102, the decision unit 2103 calculates a metric, and obtains and outputs a transmission signal candidate where a metric become a minimum, along with the decision value s$_e$(i) obtained from the transmission signal candidate search unit 2101.

In addition, while, here, a case has been described in which one small element exists within the diagonal elements of the P, the present invention is not limited to this, and may also be applied to a case in which a plurality of elements exists, in the same way.

In addition, in order to determine whether an error is small within the elements of a signal after the MMSE detection, it may be possible to perform determination on the basis of whether communication quality (the error rate or the like of a bit or a packet) a system requests may be satisfied. For example, if an SNR (signal power to noise power ratio: Signal to Noise Power Ratio) capable of satisfying desired quality is n (a true value), an element satisfying $\sigma_n^2 P(i,i) < 1/n$ may be subjected to hard decision. In addition, the n may also be changed on the basis of a modulation method.

In addition, in order to determine whether the error of a signal after the MMSE detection is small, a bit log-likelihood ratio may be used that is obtained by subjecting the signal after the MMSE detection to soft decision. In the case of determination performed in units of bits, whether to be a value in which the absolute value of a bit log-likelihood ratio is large, for example, a value in which tan h(|λ|) may be approximated by "1" if the bit log-likelihood ratio is λ. The tan h( ) is a hyperbolic tangent function. In the case of determination performed in units of the elements of the x^, if it has been determined that all bit log-likelihood ratios obtained by subjecting the elements to soft decision are large, the elements may be subjected to hard decision.

In this way, in the above-mentioned present embodiment, a signal size where (quasi) maximum likelihood detection is performed is reduced. Therefore, it may be possible to reduce computation amounts in the transmission signal candidate search unit 2101 to the decision unit 2103.

Third Embodiment

In the first embodiment, using the estimated channel matrix H^, a transmission signal candidate is generated. In the present embodiment, in the signal detection unit 203*a* in FIG. 2, the H^ and the reception signal y are expanded as shown in the following Expression, and used.

[Math. 21]

$$\overline{H} = \begin{bmatrix} \hat{H} \\ \sigma_n I_{NT} \end{bmatrix} \quad (21)$$

$$\overline{y} = \begin{bmatrix} y \\ 0_{NT} \end{bmatrix} \quad (22)$$

In this regard, however, the $0_{NT}$ is an NT-dimensional vector whose all elements are "0". The H^ and the y are replaced with the channel matrix and the reception signal, expanded in such a way, are processed in the same way as the first embodiment. In this way, since the orthogonalization of a basis may be performed with a higher degree of accuracy, reception performance is improved. The expanded channel matrix and reception signal may also be used in subsequent embodiments.

Fourth Embodiment

Figure 7:
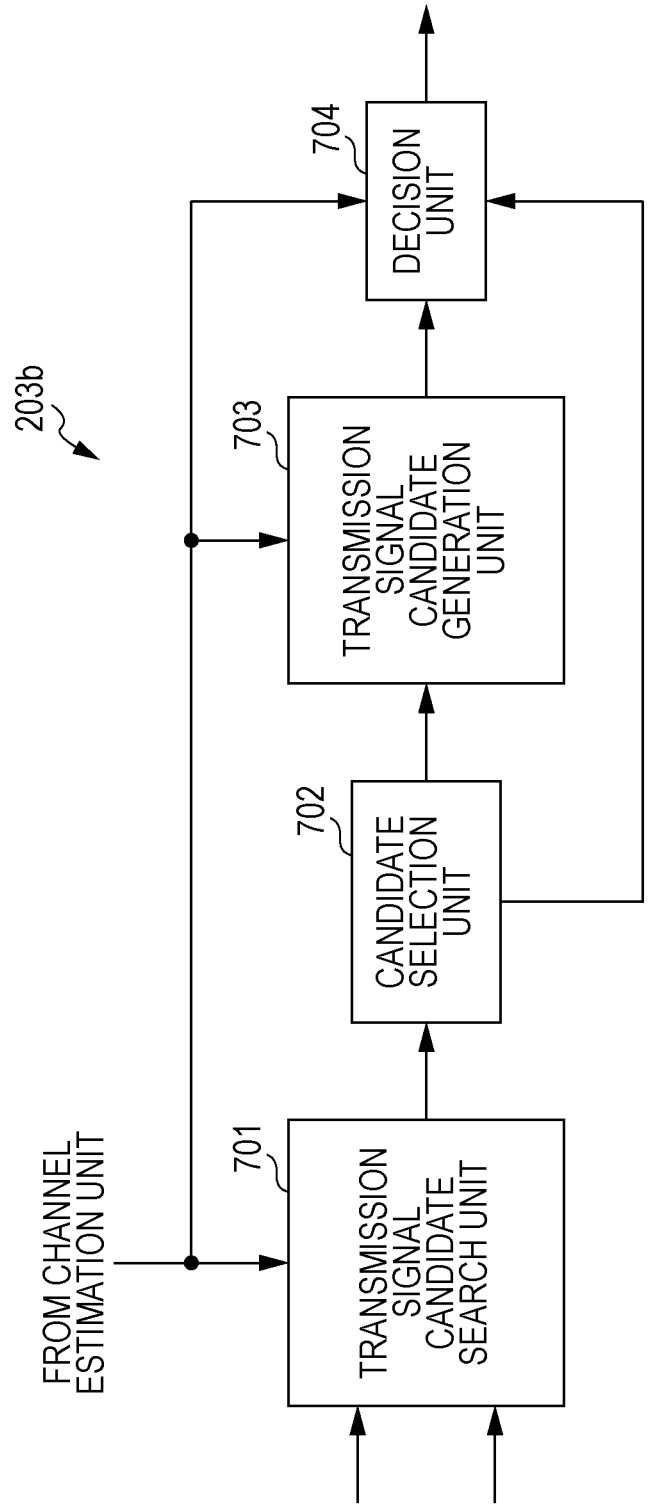
FIG. 7 is a schematic block diagram of a signal detection unit in a fourth embodiment.

Since there is a difference in the signal detection unit 203 between the present embodiment and the above-mentioned first embodiment, the other description will be omitted. FIG. 7 is a schematic block diagram of a signal detection unit 203*b*.

The signal detection unit 203*b* in the present embodiment includes a transmission signal candidate search unit 701, a candidate selection unit 702, a transmission signal candidate generation unit 703, and a decision unit 704.

Since the transmission signal candidate search unit 701 is the same as the transmission signal candidate search unit 301 described in the first embodiment, the description thereof will be omitted. The candidate selection unit 702 outputs, to the transmission signal candidate generation unit 703, some of signals the transmission signal candidate search unit 701 has searched for, and quantizes and outputs, to the decision unit 704, all remaining signals or some of remaining signals. In the same way as the first embodiment, with respect to an input signal, the transmission signal candidate generation unit 703 suppresses the influence of the spatial correlation of a channel, and obtains a transmission signal candidate. From among transmission signal candidates obtained from the candidate selection unit 702 and transmission signal candidates obtained from the transmission signal candidate generation unit 703, the decision unit 704 selects and outputs a transmission signal candidate where a metric becomes a minimum. The transmission signal candidate generation unit 703 has exactly the same as the configuration in FIG. 4.

The candidate selection unit 702 may output, to the transmission signal candidate generation unit 703, all of the signals the transmission signal candidate search unit 701 has searched for, may also output some signals, and may not output a signal to the transmission signal candidate generation unit 703. The case of outputting no signal corresponds to switching relating to whether to suppress the influence of the spatial correlation of a channel. According to this, processing in the transmission signal candidate generation unit 703 is not performed, and hence, it may be possible to reduce a calculation amount. In addition, in a case where the influence of the spatial correlation of a channel is suppressed with respect only to some signals, it may not be necessary to output all remaining signals to the decision unit 704. This further reduces the number of transmission signal candidates, and hence, it may be possible to reduce a calculation amount in the decision unit 704. A threshold value based on the spatial correlation of a channel may be used for criterion for selection due to the candidate selection unit 702, and in a case where, on the basis of the threshold value, it has been determined that the spatial correlation of a channel is large, the influence of the spatial correlation of a channel is suppressed. In a case where, on the basis of the threshold value, it has been determined that the spatial correlation of a channel is small, the influence of the spatial correlation of a channel is not suppressed. The spatial correlation value of a channel, a distance between a transmitting device and a receiving device, a transmit antenna interval, a receive antenna interval, the angular information of a path, or the like may be used for the threshold value. The spatial correlation value of a channel may be obtained from a channel matrix estimated in a time period. The distance between a transmitting device and a receiving device may be obtained from a difference between transmission power and reception power in a simple way.

Figure 8:
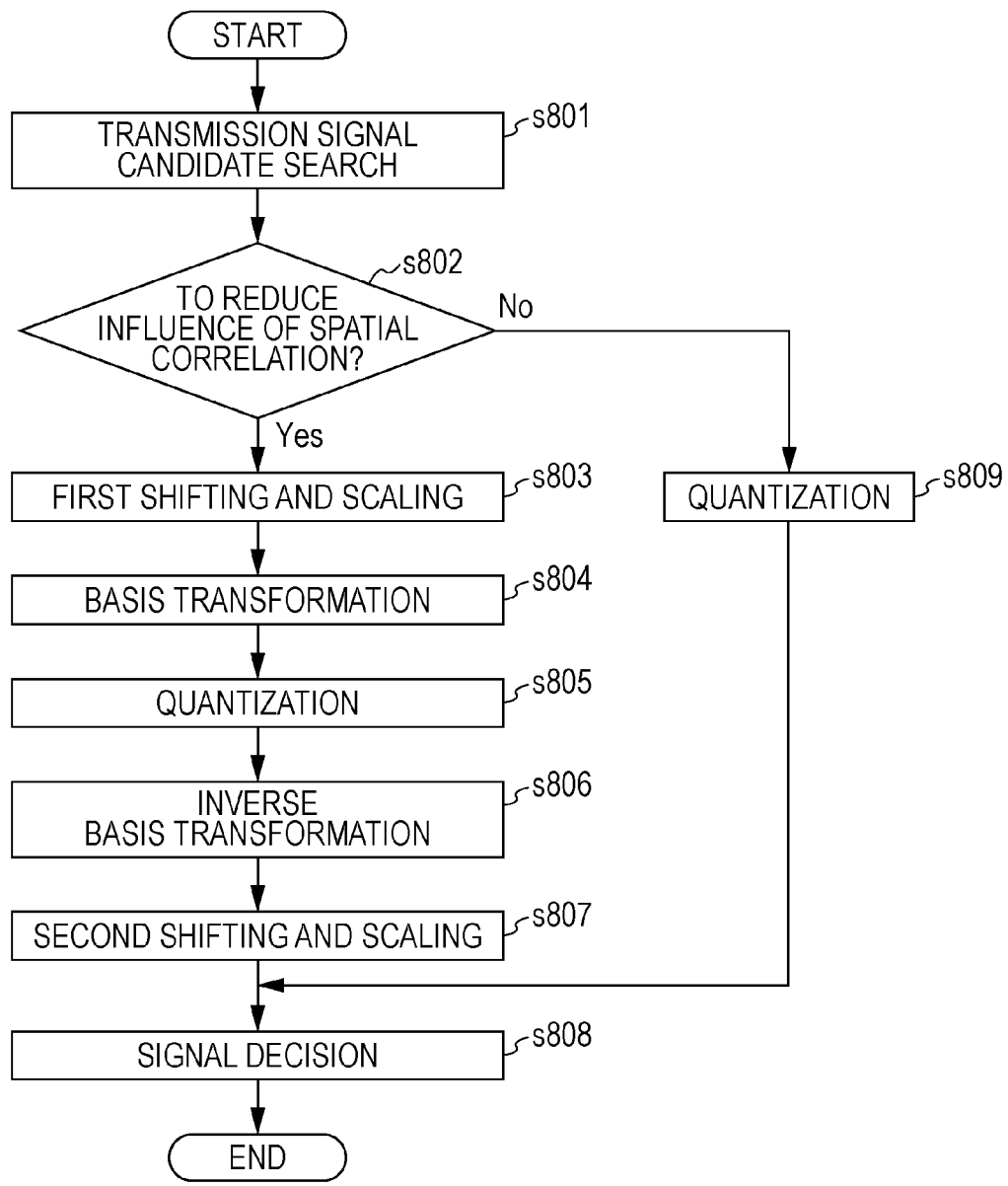
FIG. 8 is a flowchart of reception processing in the fourth embodiment.

FIG. 8 is a flowchart of reception processing in the present embodiment.

In step s801, the transmission signal candidate search unit 701 searches for a transmission signal candidate with the detection result of MMSE as a starting point and taking into consideration noise enhancement. In step s802, it is determined whether to reduce the influence of the spatial correlation of a channel within a signal the candidate selection unit 702 has searched for. In the case of not reducing, quantization is performed by the candidate selection unit 702 in step s809, and a transfer to step s808 is made. The quantization in the step s809 performs hard decision. In the case of reducing, a transmission signal candidate the candidate selection unit 702 has searched for is sent to the transmission signal candidate generation unit 703. In step s803, in order to perform quantization in a subsequent stage, the first shifting and scaling unit 401 in the transmission signal candidate generation unit 703 performs shifting and scaling in accordance with a modulation method. In step s804, the basis transformation unit 402 performs basis transformation, and in step s805, the quantization unit 403 performs quantization in which each of a real part and an imaginary part is rounded to an integer value. In step s806, the inverse basis transformation unit 404 performs the inverse transformation of the transformation in the step s804, and in step s807, the second shifting and scaling unit 405 reverses the shifting and scaling performed in the step s803. In the step s808, from among transmission signal candidates obtained in the step s807 and the step s809, the decision unit 704 obtains and outputs a maximum likelihood sequence.

In this way, in the present embodiment, a signal is selected where the influence of the spatial correlation of a channel is to be suppressed, or the number of transmission signal candidates is further reduced. Therefore, it may be possible to reduce a calculation amount in the transmission signal candidate generation unit 703 or a calculation amount in the decision unit 704.

Fifth Embodiment

In the present embodiment, an example of a case of performing error correction coding will be described. In addition, in the present embodiment, a case will be described in which the present invention is applied to MIMO-OFDM (Orthogonal Frequency Division Multiplexing). In addition, since the MIMO-OFDM becomes narrow band MIMO in each subcarrier, it may be possible to easily apply the first to fourth embodiments to the MIMO-OFDM. Naturally, it may also be possible to apply the present embodiment to the narrow band MIMO.

Figure 9:
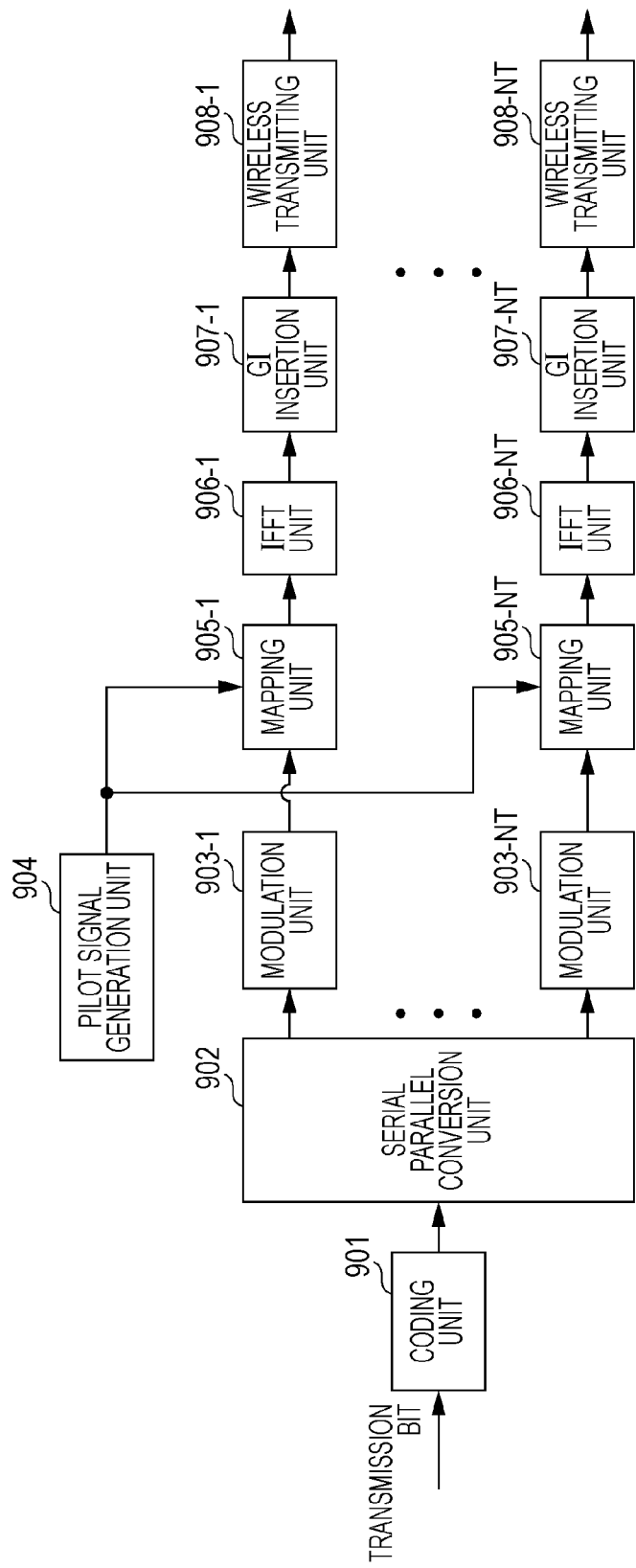
FIG. 9 is a block diagram illustrating a configuration of a transmitting device in a fifth embodiment.

FIG. 9 is a block diagram illustrating the configuration of a transmitting device in the present embodiment.

The transmitting device includes a coding unit 901, a serial parallel conversion unit 902, modulation units 903-1 to 903-NT, a pilot signal generation unit 904, mapping units 905-1 to 905-NT, IFFT units 906-1 to 906-NT, GI insertion units 907-1 to 907-NT, and wireless transmitting units 908-1 to 908-NT.

In the coding unit 901, transmission bits are coded with an error correction code such as a convolutional code, a turbo code, or an LDPC (Low Density Parity Check) code, and coded bits are obtained. The coded bits are serial-parallel converted in the serial parallel conversion unit 902, and divided into sequences to be transmitted from individual transmit antennas. The modulation units 903-1 to 903-NT map divided coded bits to modulation symbols such as PSK or QAM, and the pilot signal generation unit 904 generates a pilot signal serving as a signal already known on transmission and reception sides. The mapping units 905-1 to 905-NT allocate the modulation symbol and the pilot signal to a resource. In the case of the OFDM, it is assumed that the resource is defined by a time (an OFDM symbol or the like) and a frequency (a subcarrier or the like). The outputs of the mapping units 905-1 to 905-NT are individually subjected to frequency-time transformation in the IFFT (Inverse Fourier Transform) units 906-1 to 906-NT, guard intervals are inserted thereinto in the GI (Guard Interval) insertion units 907-1 to 907-NT, digital-to-analog conversion, waveform shaping, frequency conversion, and so forth are performed thereon in the wireless transmitting units 908-1 to 908-NT, and the outputs of the mapping units 905-1 to 905-NT are transmitted from individual transmit antennas (not illustrated).

Figure 10:
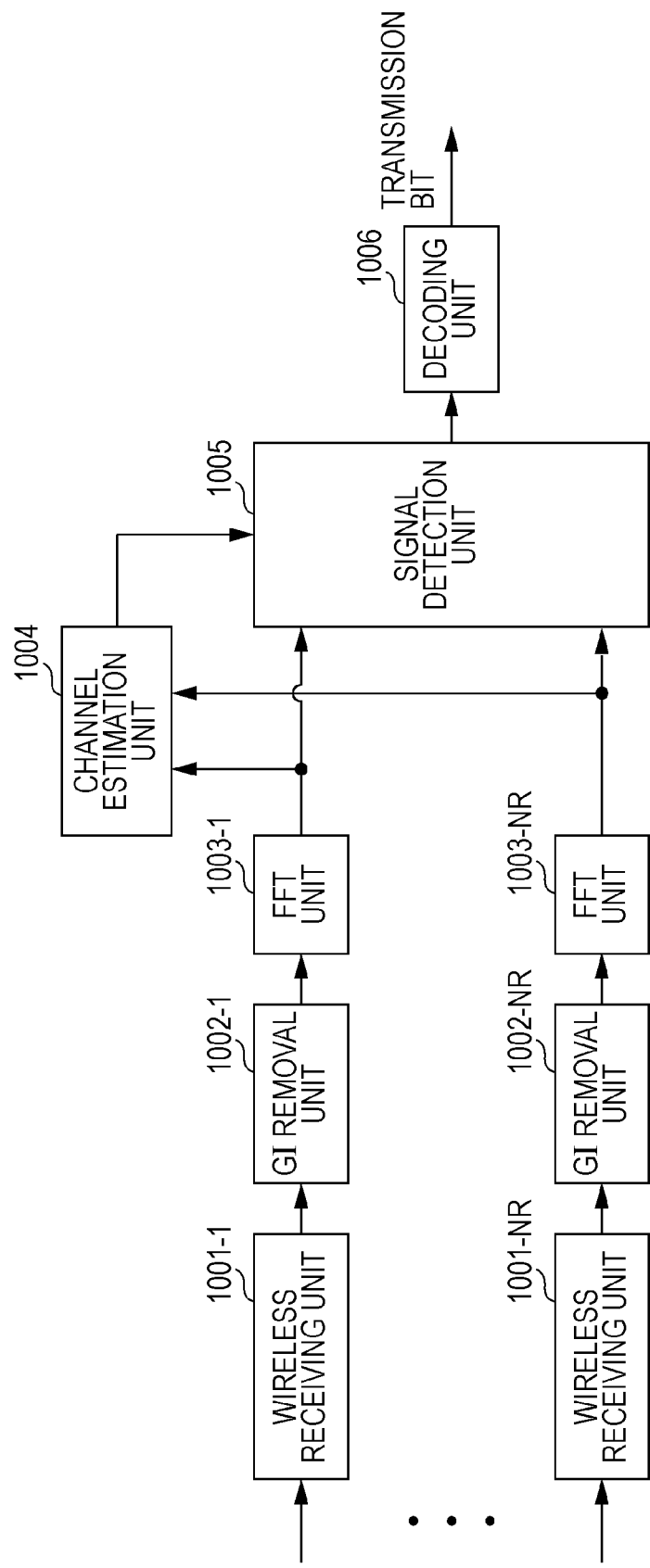
FIG. 10 is a block diagram illustrating a configuration of a receiving device in the fifth embodiment.

FIG. 10 is a block diagram illustrating the configuration of a receiving device in the present embodiment.

The receiving device includes wireless receiving units 1001-1 to 1001-NR, GI removal units 1002-1 to 1002-NR, FFT (Fourier Transform) units 1003-1 to 1003-NR, a channel estimation unit 1004, a signal detection unit 1005, and a decoding unit 1006.

Reception waves received by receive antennas (not illustrated) whose number is NR are subjected to frequency conversion, filtering, and analog-to-digital conversion in the wireless receiving units 1001-1 to 1001-NR. In addition, in the GI removal units 1002-1 to 1002-NR, guard intervals are removed, and time-frequency transformation is performed in the FFT units 1003-1 to 1003-NR. In the channel estimation unit 1004, using a pilot signal, a frequency response is estimated, and a channel estimation value is obtained. The signal detection unit 1005 performs MIMO detection using each subcarrier, and obtains a bit log-likelihood ratio (LLR) indicating the reliability of a bit. The decoding unit 1006 performs error correction decoding, and obtains a transmission bit.

Figure 11:
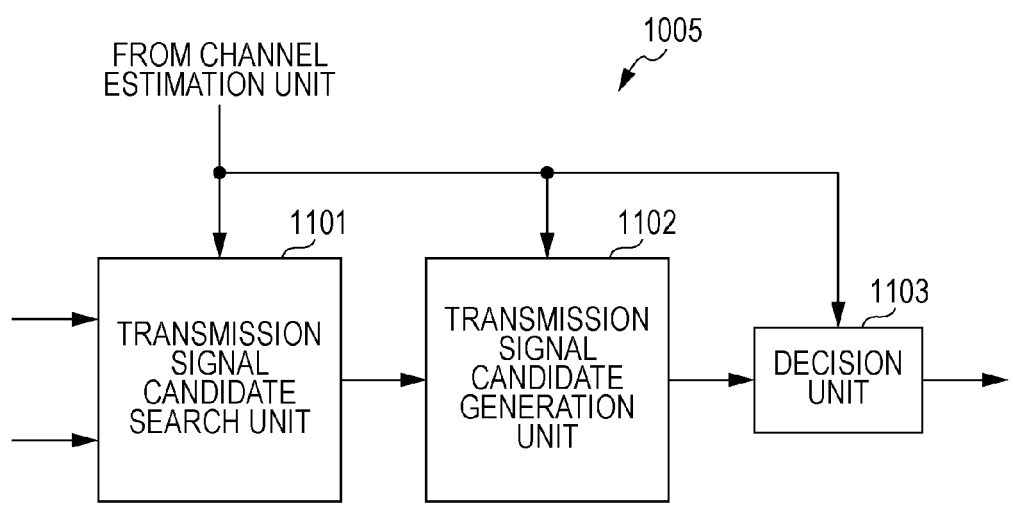
FIG. 11 is a schematic block diagram of a signal detection unit in the fifth embodiment.

FIG. 11 is a schematic block diagram of the signal detection unit 1005. The signal detection unit 1005 includes a transmission signal candidate search unit 1101, a transmission signal candidate generation unit 1102, and a decision unit 1103. Since the transmission signal candidate search unit 1101 and the transmission signal candidate generation unit 1102 are the same as in the first embodiment, the description thereof will be omitted. Using a transmission signal candidate, the decision unit 1103 obtains a bit log-likelihood ratio serving as a maximum likelihood sequence in a case where soft decision is performed in such a way as the following Expression.

[Math. 22]

$$\lambda_{k,n} = -\frac{1}{\sigma_n^2} \min_{b^+} \|y - \hat{H}s_b\|^2 + \frac{1}{\sigma_n^2} \min_{b^-} \|y - \hat{H}s_b\|^2 \quad (23)$$

In this regard, however, the λk,n is the log-likelihood ratio of the n-th bit of a modulation symbol transmitted from the k-th transmit antenna. In addition, the $s_b$ denotes a transmission signal candidate defined by b=[$b_{1,1}, \ldots, b_{k,n}, \ldots, b_{NT,N}$]. The b$^+$ denotes, from among b, a set where $b_{k,n}=1$ is satisfied, and b$^+$=[$b_{1,1}, \ldots, b_{k,n}=1, \ldots, b_{NT,N}$] is satisfied. The b$^-$ denotes, from among the b, a set where $b_{k,n}=0$ is satisfied, and b$^-$=[$b_{1,1}, \ldots, b_{k,n}=0, \ldots, b_{NT,N}$] is satisfied. Accordingly, the $\lambda_{k,n}$ is obtained on the basis of a difference between a minimum metric generated using the b$^+$ and a minimum metric generated using the b$^-$.

In this way, since, in the present embodiment, error correction coding is performed, it may be possible to improve reception performance.

In addition, while, in the above-mentioned fifth embodiment, coded bits are subjected to serial parallel conversion to obtain a data stream, the present invention is not limited to this, and coded bits may also be obtained by performing coding with respect to each stream.

Sixth Embodiment

Figure 12:
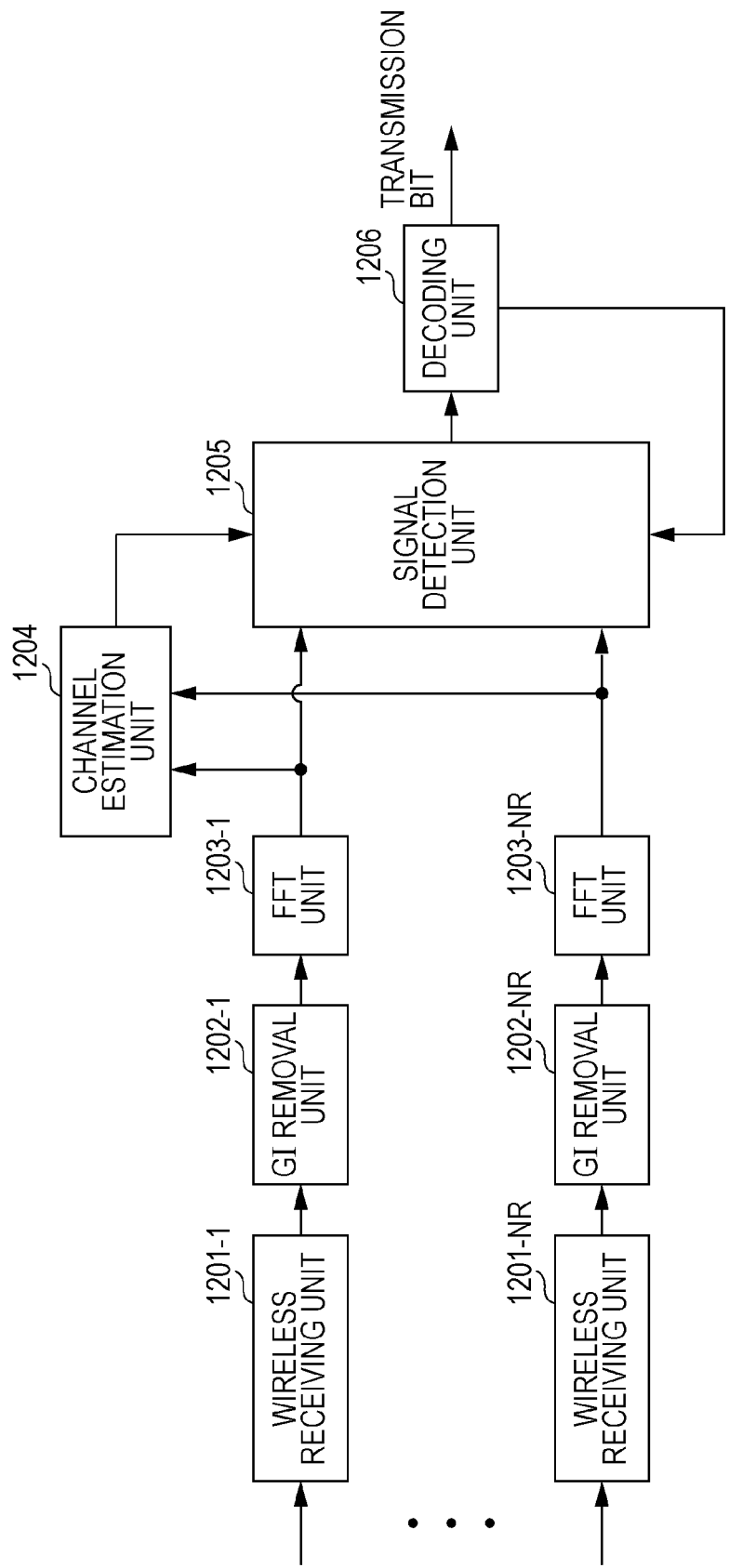
FIG. 12 is a block diagram illustrating a configuration of a receiving device in a sixth embodiment.

FIG. 12 is a block diagram illustrating the configuration of a receiving device in the present embodiment.

The receiving device includes wireless receiving units 1201-1 to 1201-NR, GI removal units 1202-1 to 1202-NR, FFT (Fourier Transform) units 1203-1 to 1203-NR, a channel estimation unit 1204, a signal detection unit 1205, and a decoding unit 1206.

Since there are only differences in the operations of the signal detection unit 1205 and the decoding unit 1206 between the receiving device in the present embodiment and the receiving device in the fifth embodiment, the description of the other blocks will be omitted. Using a bit log-likelihood ratio after decoding, obtained from the decoding unit 1206, the signal detection unit 1205 obtains a bit log-likelihood ratio with a higher degree of accuracy. If, as a result of error correction decoding, an error has detected and decoding has not been performed up to a specified number of times, the decoding unit 1206 outputs a bit log-likelihood ratio to the signal detection unit 1205. In a case where an error has not detected or decoding has been performed up to a specified number of times, a transmission bit obtained as a result of decoding is output. In addition, CRC (Cyclic Redundancy Check) may be used for detecting an error.

Figure 13:
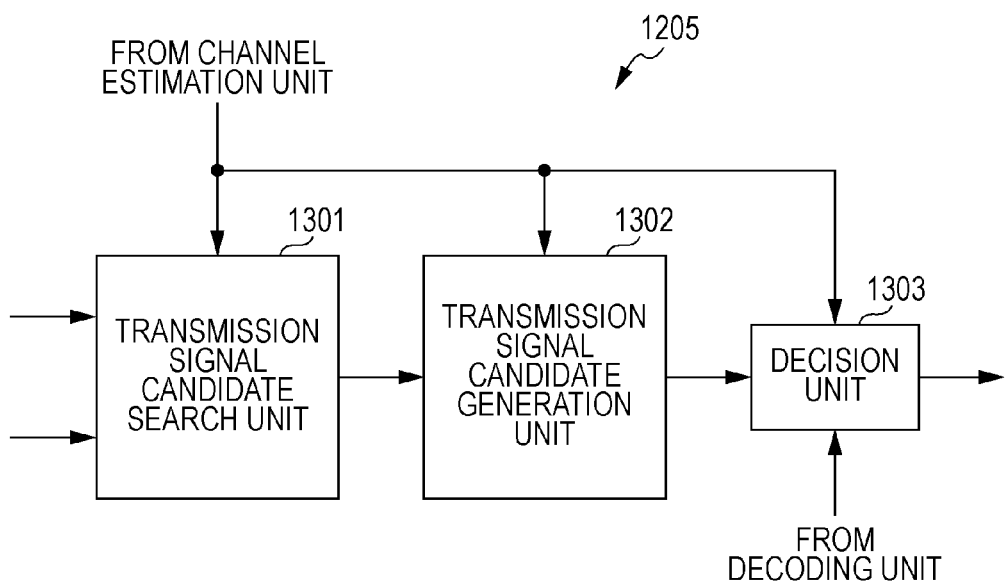
FIG. 13 is a schematic block diagram of a signal detection unit in the sixth embodiment.

FIG. 13 is a schematic block diagram of the signal detection unit 1205.

The signal detection unit 1205 includes a transmission signal candidate search unit 1301, a transmission signal candidate generation unit 1302, and a decision unit 1303. In the same way as described in the above-mentioned embodiment, the transmission signal candidate search unit 1301 searches for a transmission signal candidate. The transmission signal candidate generation unit 1302 has the same as the configuration in FIG. 4, and generates a transmission signal candidate by suppressing the influence of a spatial correlation. Using a bit log-likelihood ratio obtained from the decoding unit 1206, the decision unit 1303 obtains a bit log-likelihood ratio after MIMO detection, in the following way.

[Math. 23]

$$\lambda_{k,n} = \min_{b^+}\left[-\frac{\|y-\hat{H}s_b\|^2}{\sigma_n^2} + \sum_{k' \neq k, n' \neq n} \log p(b_{k',n'})\right] - \min_{b^-}\left[-\frac{\|y-\hat{H}s_b\|^2}{\sigma_n^2} + \sum_{k' \neq k, n' \neq} \log p(b_{k',n'})\right] \quad (24)$$

In addition, the p($b_{k,n}$) denotes the occurrence probability of the $b_{k,n}$ denoting the n-th bit of a modulation symbol transmitted from the k-th transmit antenna. The p($b_{k,n}$) may be obtained from the bit log-likelihood ratio obtained from the decoding unit 1206. In addition, the transmission signal candidate search unit 1301 may obtain the expectation value of a modulation symbol from the bit log-likelihood ratio, and may also search for a transmission signal with that as a starting point. In addition, in the case of searching for a transmission signal using the bit log-likelihood ratio, while not illustrated, the bit log-likelihood ratio is input to the transmission signal candidate search unit 1301. In addition, a candidate where a metric is large as the result of metric computation in the decision unit 1303 may be deleted from transmission signal candidates in subsequent repetitive processing. In addition, a case where a predetermined number of times decoding is performed is set to "1" becomes equal to the fifth embodiment.

Figure 14:
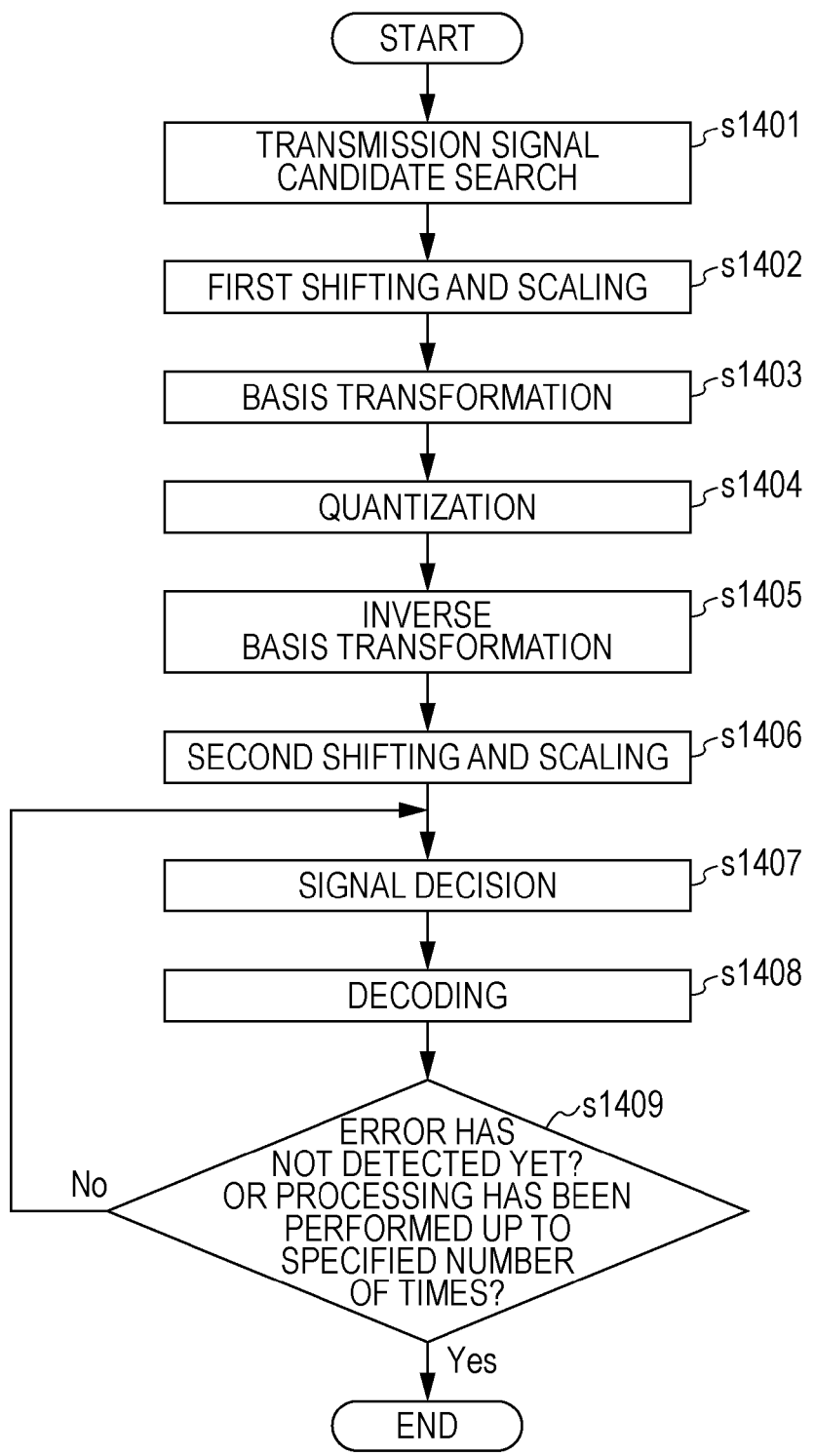
FIG. 14 is a flowchart of reception processing in the sixth embodiment.

FIG. 14 is a flowchart of reception processing in the present embodiment.

In step s1401, the transmission signal candidate search unit 1301 searches for a transmission signal candidate with the detection result of MMSE as a starting point and taking into consideration noise enhancement, and sends a result to the transmission signal candidate generation unit 1302. In step s1402, the first shifting and scaling unit 401 in the transmission signal candidate generation unit 1302 performs shifting and scaling on the basis of a modulation method so that quantization is able to be performed. In step s1403, the basis transformation unit 402 performs the basis transformation of a channel matrix using a basis transformation matrix. In step s1404, the quantization unit 403 performs quantization approximating by an integer value. In step s1405, the inverse basis transformation unit 404 performs the inverse operation of the basis transformation performed in the step s1403. In step s1406, the second shifting and scaling unit 405 performs the inverse operation of the processing operation performed in the step s1402 and obtains a transmission signal candidate. In step s1407, using a transmission signal candidate and the bit log-likelihood ratio of a decoding result, the decision unit 1303 performs maximum likelihood detection based on soft decision. In step s1408, the decoding unit 1206 performs error correction decoding on a bit log-likelihood ratio obtained as a result of the maximum likelihood detection based on soft decision. In step s1409, the decoding unit 1206 determines whether an error has not detected yet or decoding processing has been performed up to a specified number of times, and in a case where an error has detected and decoding processing has not been performed up to a specified number of times, a transfer to the step s1407 is made. In a case where an error has not detected yet or decoding processing has been performed up to a specified number of times, a transmission bit obtained by decoding is output, and the reception processing is terminated.

In this way, using the bit log-likelihood ratio of a decoding result, the maximum likelihood detection based on soft decision is performed. Therefore, it may be possible to further increase the accuracy of the MIMO detection.

In addition, a program operating in a receiving device relating to the present invention is a program (a program causing a computer to function) controlling a CPU or the like so as to realize the function of the above-mentioned embodiment relating to the present invention. In addition, pieces of information handled in these devices are temporarily accumulated in a RAM at the time of the processing thereof, stored in a various kinds of ROMs or HDDs after that, and read by the CPU as appropriate, and revision and writing are performed thereon. As a recording medium storing therein the program, any one of a semiconductor medium (for example, a ROM, a nonvolatile memory card, or the like), an optical recording medium (for example, a DVD, an MO, an MD, a CD, a BD, or the like), a magnetic recording medium (for example, a magnetic tape, a flexible disk, or the like), and so forth may be adopted. In addition, by executing the loaded program, the function of the above-mentioned embodiment is realized. In addition to this, on the basis of the instruction of the program, processing is performed in collaboration with an operating system, another application program, or the like, and hence, the function of the present invention is also realized in some cases.

In addition, in the case of being distributed in a market, the program may be stored in a portable recording medium and distributed, or may be transferred to a server computer connected through a network such as Internet. In this case, a storage device in the server computer is also included in the present invention. In addition, parts of a mobile station device and a base station device in the above-mentioned embodiment or the whole thereof may also be realized as an LSI serving as a typical integrated circuit. Individual functional blocks in the receiving device may also be independently put into chips, and all or part thereof may also be integrated and put into a chip. In a case where individual functional block are circuit-integrated, an integrated circuit control unit controlling these is added.

In addition, a method for circuit integration is not limited to an LSI, and realization may also be performed using a dedicated circuit or a general-purpose processor. In addition, in a case where, owing to the development of a semiconductor technology, a technology for circuit integration emerges that substitutes for an LSI, an integrated circuit based on the corresponding technology may also be used.

While, as described above, the embodiments of the present invention have been described in detail with reference to drawings, a specific configuration is not limited to the present embodiments, and design and so forth falling within a scope not departing from the scope of the invention are also included in the scope of the Claims.

REFERENCE SIGNS LIST 201 wireless receiving unit
202 channel estimation unit
203, 203a, 203b signal detection unit
301 transmission signal candidate search unit
302 transmission signal candidate generation unit
303 decision unit
401 first shifting and scaling unit
402 basis transformation unit
403 quantization unit
404 inverse basis transformation unit
405 second shifting and scaling unit
701 transmission signal candidate search unit
702 candidate selection unit
703 transmission signal candidate generation unit
704 decision unit
1001 wireless receiving unit
1002 GI removal unit
1003 FFT unit
1004 channel estimation unit
1005 signal detection unit
1006 decoding unit
1101 transmission signal candidate search unit
1102 transmission signal candidate generation unit
1103 decision unit
1201 wireless receiving unit
1202 GI removal unit
1203 FFT unit
1204 channel estimation unit
1205 signal detection unit
1206 decoding unit
1301 transmission signal candidate search unit
1302 transmission signal candidate generation unit
1303 decision unit
2001 basis transformation unit
2002 first shifting and scaling unit
2003 quantization unit
2004 second shifting and scaling unit
2005 inverse basis transformation unit
2101 transmission signal candidate search unit
2102 transmission signal candidate generation unit
2103 decision unit

The invention claimed is:

1. A receiving device that performs communication using MIMO transmission, the receiving device comprising:
a transmission signal candidate search unit configured to search for transmission signal candidates with taking into consideration noise enhancement;
a transmission signal candidate generation unit configured to generate transmission signal candidates from the searched signals while suppressing an influence of a spatial correlation of a channel; and
a decision unit configured to obtain a maximum likelihood sequence using the generated transmission signal candidates.

2. The receiving device according to claim 1, wherein the transmission signal candidate generation unit includes
a first shifting and scaling unit configured to perform shifting and scaling on the basis of a modulation method,
a basis transformation unit configured to perform basis transformation by multiplying a basis transformation matrix,
a quantization unit configured to round to an integer value,
an inverse basis transformation unit configured to perform an inverse operation of an operation performed by the basis transformation unit, and
a second shifting and scaling unit configured to perform an inverse operation of an operation performed by the first shifting and scaling unit and generate the transmission signal candidates.

3. The receiving device according to claim 1, wherein the transmission signal candidate generation unit includes
a basis transformation unit configured to perform basis transformation by multiplying a basis transformation matrix,
a first shifting and scaling unit configured to perform shifting and scaling on the basis of a modulation method,
a quantization unit configured to round to an integer value,
a second shifting and scaling unit configured to perform an inverse operation of an operation performed by the first shifting and scaling unit, and an inverse basis transformation unit configured to perform an inverse operation of an operation performed by the basis transformation unit and generate the transmission signal candidates.

4. The receiving device according to claim 2, wherein the transmission signal candidate generation unit generates the transmission signal candidates using a channel matrix and a reception signal that are expanded.

5. The receiving device according to claim 1, wherein the transmission signal candidate search unit searches for transmission signal candidates with taking into consideration an arbitrary position expressed by noise enhancement and expressed by an IQ plane.

6. The receiving device according to claim 1, wherein the transmission signal candidate search unit searches for transmission signal candidates with taking into consideration noise enhancement and a modulation method.

7. The receiving device according to claim 1, wherein the transmission signal candidate search unit searches for transmission signal candidates corresponding to a part of signals obtained by a linear detection and performs hard decision on remaining signals obtained by the linear detection and outputs resultant signals.

8. The receiving device according to claim 7, wherein the transmission signal candidate generation unit generates transmission signal candidates using a channel corresponding to the part of signals.

9. The receiving device according to claim 1, further comprising
a candidate selection unit configured to perform selection relating to whether or not to suppress the influence of a spatial correlation over the searched signals on the basis of the spatial correlation of a channel.

10. The receiving device according to claim 9, wherein the candidate selection unit generates transmission signal candidates by quantizing signals that are not suppressed by the influence of a spatial correlation, and the decision unit obtains a maximum likelihood sequence using transmission signal candidates generated by the transmission signal candidate generation unit and transmission signal candidates generated by the candidate selection unit.

11. The receiving device according to claim 1, further comprising:
a decoding unit configured to perform error correction decoding, wherein
the decision unit obtains a bit log-likelihood ratio of the maximum likelihood sequence, and
the decoding unit performs error correction decoding on the bit log-likelihood ratio of the maximum likelihood sequence.

12. The receiving device according to claim 11, wherein the decision unit obtains the bit log-likelihood ratio of the maximum likelihood sequence based on the transmission signal candidates and a bit log-likelihood ratio after the decoding.

13. A receiving method for a receiving device performing communication using MIMO transmission, the receiving method comprising:
a transmission signal candidate search process searching for transmission signal candidates with taking into consideration noise enhancement;
a transmission signal candidate generation process generating transmission signal candidates from the searched signals while suppressing an influence of a spatial correlation of a channel; and
a decision process of obtaining a maximum likelihood sequence using the generated transmission signal candidates.

14. A non-transitory recording medium storing a receiving program for causing a computer to execute the individual processes in the receiving method according to claim 13.

* * * * *